United States Patent [19]
Chase et al.

[11] Patent Number: 5,813,012
[45] Date of Patent: Sep. 22, 1998

[54] SOFTWARE REDEVELOPMENT PARTITIONER

[75] Inventors: Tom Chase, Ann Arbor; Chuck Weingart, Livonia; Michael A. Nykiel, Shelby Township; John R. Oetjens, Rochester, all of Mich.

[73] Assignee: Chrysler Corporation, Auburn Hills, Mich.

[21] Appl. No.: 769,042

[22] Filed: Dec. 18, 1996

[51] Int. Cl.$^6$ ..................................... G06F 17/30
[52] U.S. Cl. ................ 707/102; 707/104; 707/103; 707/203; 707/205
[58] Field of Search ................... 707/102, 103, 707/104, 203, 205

[56] References Cited

U.S. PATENT DOCUMENTS

| | | | |
|---|---|---|---|
| 4,769,772 | 9/1988 | Dwyer | 707/104 |
| 5,448,727 | 9/1995 | Annevelink | 707/102 |
| 5,542,078 | 7/1996 | Martel et al. | 707/104 |

OTHER PUBLICATIONS

The Year 2000 and 2–Digit Dates: A Guide for Planning and Implemenatation, Third Edition, May 1996.

*Primary Examiner*—Wayne Amsbury
*Assistant Examiner*—Thu-Thao Havan
*Attorney, Agent, or Firm*—Roland A. Fuller, III

[57] ABSTRACT

Information is extracted from a redevelopment database having relational information for software programs or files, and placed in files which are subsequently used with user provided parameters, entered through a user interface, by a partitioner. The partitioner uses a two stage process to grow a partition, beginning with the first stage which involves addition and deletion of programs and files from the partition based upon a score which represents the importance of the number of connections that a program or file has in the partition and the number of connections a program or file has in the partition in relation to the programs or files total number of connections. Once a partition with a minimum number of programs or files has been reached, stage two is executed. Stage 2 continues to grow the partition until a partition with a maximum number of programs or files has been reached. This is accomplished by first adding those programs or files which have a specified percentage of their connections in the stage 1 generated partition. If this does not produce a partition with the maximum number of programs, by adding those programs or files to the partition which have a percentage of connections to programs or files currently contained in the partition and a percentage of connections to programs or files contained in partitions which were previously generated. This process is repeated, generating multiple partitions which have minimized connections to each of the other partitions generated.

20 Claims, 8 Drawing Sheets

SOFTWARE REDEVELOPMENT PARTITIONER

BACKGROUND OF THE INVENTION

1. Field of the Invention

The preferred embodiment of the present invention is directed to software redevelopment and is more particularly directed to a software redevelopment partitioning tool which optimally clusters a pool of data center executables and files into manageable conversion sizes.

2. Description of Related Art

Software redevelopment has become an increasingly important task in the day-to-day operations of many businesses. This is due to the reliance of many critical operations on large software systems. These software systems are composed of executable programs and data files which number in the hundreds of thousands, and which contain vast amounts of data. Each individual program, contained in one of these software systems, has references to other files, and likewise each data file has its own set of references. This creates an enormous system of interrelated components for which considerable time, effort, expense, and inconvenience is required for incorporation of a change. Furthermore, a significant change can cause interruptions in user accessibility and service, resulting in damaging effects to business operations.

One example is the system glitches caused by the year 2000. During the development of software systems, programs were originally written to think only in 20th-century terms, and to use two digits to store dates. Therefore, the year 2000 would be seen as 1900 by the programs as written, resulting in critical computation errors. These errors create a rolling wave of data processing malfunctions which can quickly overwhelm the mainframes, ultimately impairing a company's operations. Therefore, the programs and associated data tables must be expanded to 4 digits.

For a small software system, containing a relatively small number of programs and data files, a software change can be practically implemented without causing a significant interruption in user accessibility and service, and can generally be performed without the dedication of a significant amount of resources. However, this is not the situation when a rather large set of computer programs are involved.

For a rather large set of executables and data files, the amount of system "down time" to perform a minor software change can be significant. This has a detrimental effect upon the day-to-day operations of a business, and upon the overall performance of a company. For example, large automotive manufacturers use large software systems to perform sales transactions, maintain inventory, and store critical design information which are used by a vast network of internal accounting, engineering, and manufacturing departments, and outside suppliers and dealers. In the event that data contained in the large software system could not be accessed by these groups, tasks necessary for continued operation could not be conducted.

In order to conduct software redevelopment of large software systems in a manner which is as transparent as possible to the day-to-day operations of a business, it is necessary to break the software changes into manageable sizes which can be adequately performed with a predetermined amount of resources. In doing so, it is necessary to divide the executables and files into groups which have references to other executables or data files in the group and do not have these interrelations to software objects outside the group. This minimizes the coupling between groups, ultimately allowing modifications to a single group without requiring significant changes to other groups.

Therefore, it is an object of this invention to provide a software redevelopment apparatus and method for optimally clustering a pool of data center executables and files into distinct groups, with minimized connections between the distinct groups so that software redevelopment of the data center is divided into manageable conversion sizes which can be performed over an extended period of time, with minimal interruption to a system utilizing the pool of data center executables and files, and minimizing the work necessary to complete a software redevelopment project.

SUMMARY OF THE INVENTION

The present invention allows the division of a large scale software modification into manageable sizes. The apparatus and method provides for the optimal clustering of a pool of data center executables and files into distinct groups, with minimized connections between the distinct groups so that software redevelopment of the data center is divided into manageable conversion sizes which can be performed over an extended period of time, with minimal interruption to a system utilizing the pool of data center executables and files, and minimizing the work necessary to complete the software redevelopment project. The present invention includes a graphical user interface (GUI) for receiving user input parameters, a memory having a first data structure and a second data structure, with the first data structure having the user parameters provided through the GUI, and the second data structure having relational data of the pool of data center executables and files which are to have a software change incorporated. A partitioner is used to receive the first and second data structures, and which conducts the division of the pool of data center executables and files into distinct groups. The partitioner division is based upon the user parameters and relational data, with the data pool ultimately divided into manageable conversion sizes which can be performed over an extended period of time, with minimal interruption to systems utilizing the pool of data center executables and files, and also minimizing the work necessary to complete the whole redevelopment project.

DETAILED DESCRIPTION OF THE PREFERRED EMBODIMENTS

Figure 1:
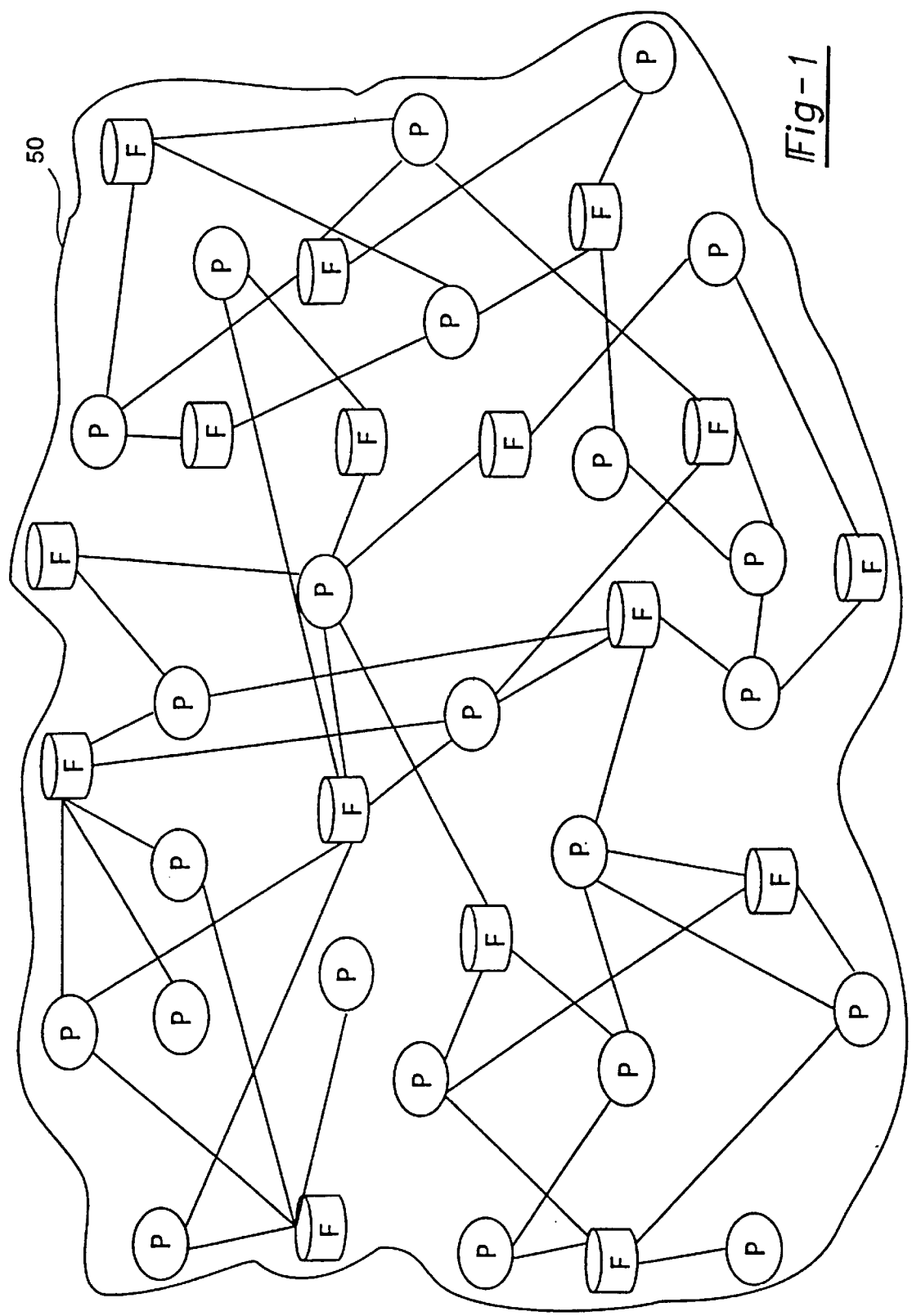
FIG. 1 is an illustration of the references between software objects in a large software system.

FIG. 1 represents a pool 50 of programs and files at a given data center that require a specific software modification. For illustrative purposes, the pool 50 is a part of large scale software system utilized in the day-to-day operations of a large automotive manufacturer, with the software system, including the pool 50, having data and executable programs necessary for the continued production and support of automobiles. As this automobile business has grown, it has become necessary to expand the part number field size, which is employed throughout the company to uniquely identify all vehicle parts, from eight to ten digits. The pool 50 therefore contains the programs and files which contain part numbers or references thereto.

The number of programs and files contained in this pool 50 can exceed 100,000, with each program having a set of referential dependencies to files, and each file also having its own set of referential dependencies. As can be seen in FIG. 1, the pool 50 of programs and files can be thought of as a large network with objects as nodes and their connections as the lines that connect them. The goal in creating partitions consists of drawing a container around a subset of nodes in the pool 50 that minimizes the number of lines that cross the container's boundary to other nods that are not already in the container.

The number of possible solutions to this container development (i.e. generation of partitions) with specific node subsets contained within, is dependent upon the number of objects, the number of connections, and the size and number of containers (partitions) desired. The nature of the problem results in an exponential (i.e. combinatorial) explosion in the number of solutions with respect to the above parameters. For example, given a pool of 100,000 objects, development of a first partition having 10,000 objects to be modified would result in at least $10^{40,000}$ possible solutions. This is shown by equation (1).

$$100,000!-90,000!=100,000\times 99,999\times 99,998\times \ldots 90,001> 10^{40000} \quad (1)$$

Due to this vast number of potential partitioning solutions, convention approaches, which use exhaustive search techniques, would be impractical. Therefore, the approach taken by the preferred embodiment of the present invention has its basis in the field of emergent technologies, with use of an evolutionary technique where partitions are built up or "grown" from an available pools of objects.

Figure 2:
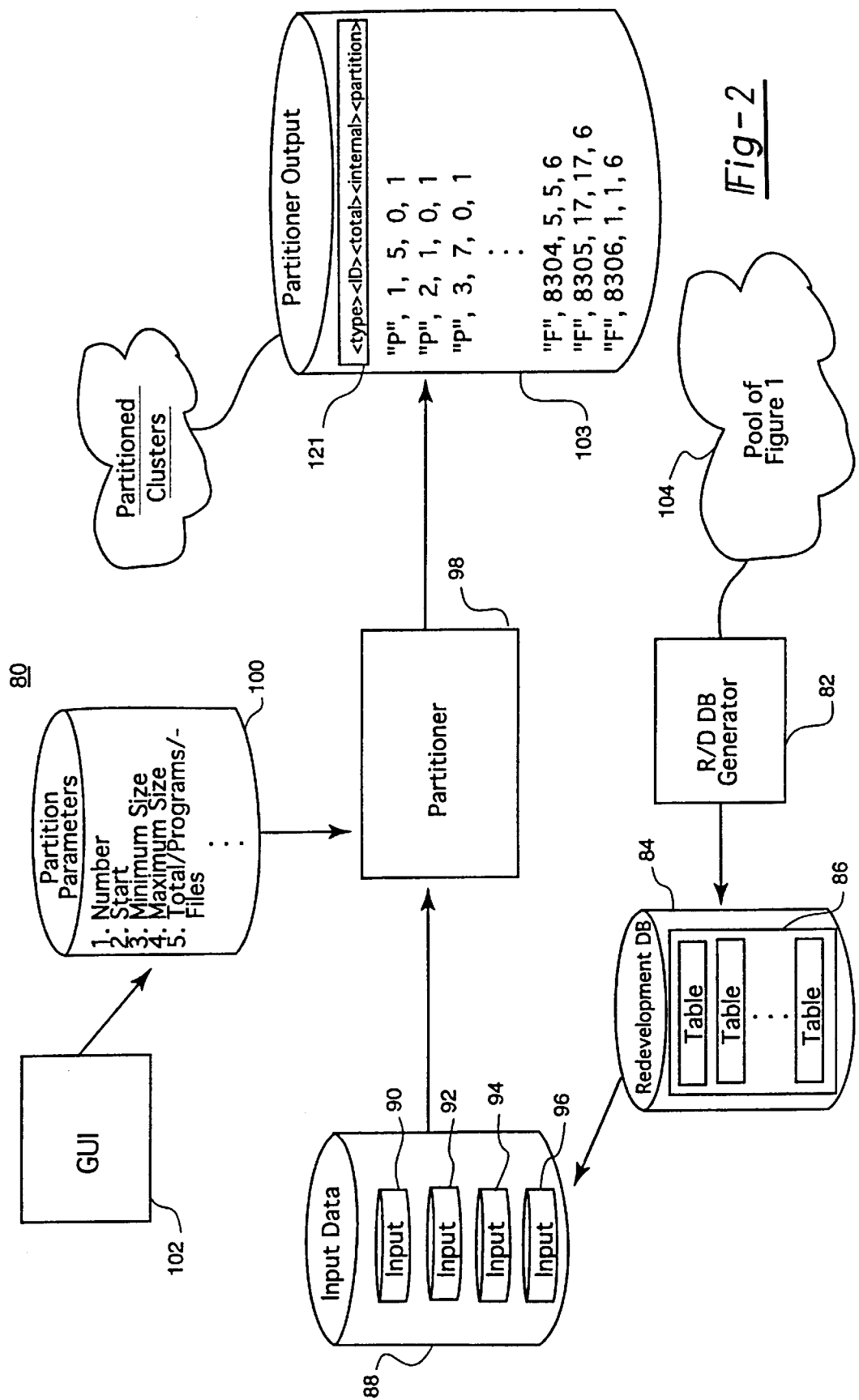
FIG. 2 is a system overview of the partitioning system of the preferred embodiment of the present invention.

The partitioning system 80 of the preferred embodiment of the present invention, which performs this evolutionary partitioning method, is shown in FIG. 2. The partitioning system 80 is comprised of: a redevelopment directory (R/D) data base generator 82, a redevelopment database 84 having multiple tables 86, partitioner input data 88 consisting of four input files (90, 92, 94, 96), and the partitioner 98, which receives user provided input parameters 100 obtained through a graphical user interface 102 (GUI) and produces an output list of optimally clustered executables and files.

Initially, the R/D database generator 82 generates the redevelopment database 84 from the pool 104 or from a complete software library (not shown in FIG. 2). The tables 86 of the redevelopment database 84 hold the information acquired by the R/D data base generator. The tables 86 store and relate information about the programs and files of the pool 104, including information concerning, but not limited to, Procedure Control Systems (PROCS), Job Control Language (JCL), Data Base 2 (DB2) tables, Information Management System (IMS) databases, Virtual Storage Access Method (VSAM), sequential files, copylibs, Data Definition (DD) statements, and Data set names (DSN). The R/D database generator 82 and the corresponding redevelopment database 84 used in the preferred embodiment are commercially available, developed by the IBM Corporation, and a detailed explanation of this software package found in *IBM Redevelopment Directory*, Version 3, Release 1, Modification 0, dated May 13, 1994.

Information is extracted from the redevelopment database 84. The data is extract using a set of SQL queries, and placed in the four partitioner input files (90, 92, 94, 96). It is these four inputs (90, 92, 94, 96) and the user parameters 100 from which the partitioner 98 divides the pool 104.

Figure 3:
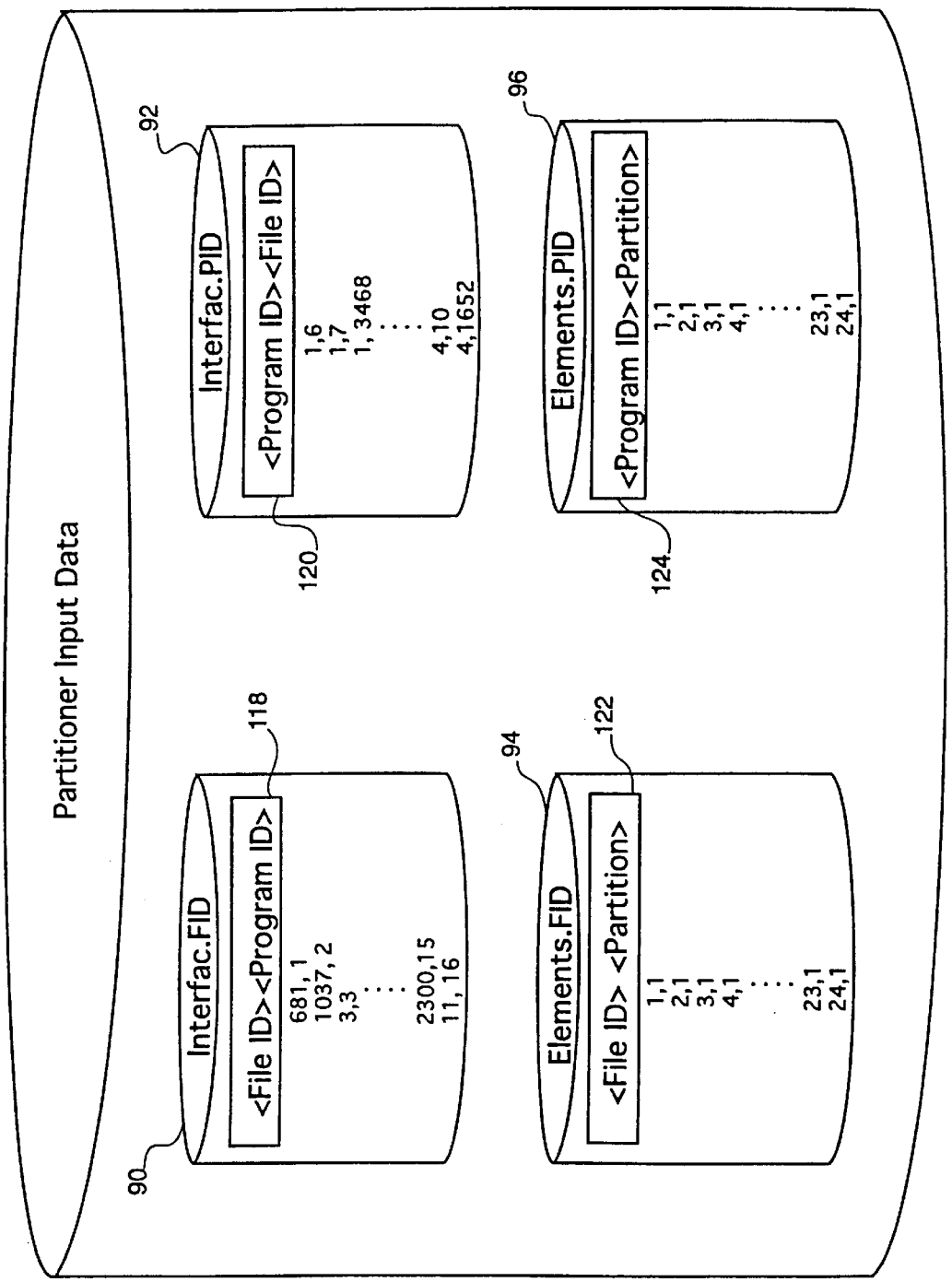
FIG. 3 is an illustration of the four partitioner input files of the preferred embodiment of the present invention.

Referring to FIG. 3, the first input 96 to the partitioner 98 is the ELEMENTS.PID file which is a list of Program Identifications and the partition, if any, to which the program has currently been assigned. It should be noted that if a program does not currently belong to a partition, a partition value of "−1" is used to indicate the un-associated status. The second input file 94 is the ELEMENTS.PID file which provides the same information as the ELEMENTS.PID file except that it is a list of File identifications and the partition, if any, to which the file has currently been assigned. The data format (122, 124) of these two files (94, 96) which were used in the preferred embodiment are also shown in FIG. 3.

The third input 92 and fourth input 90 to the partitioner 98 are the Program to File interfaces contained in the INTERFAC.PID file and INTERFAC.PID file. These two files list each program a file has references to, and each file a program has references to, respectively. The data format (118, 120) of these two files (92, 90) which were used in the preferred embodiment are also shown in FIG. 3.

Figure 4:
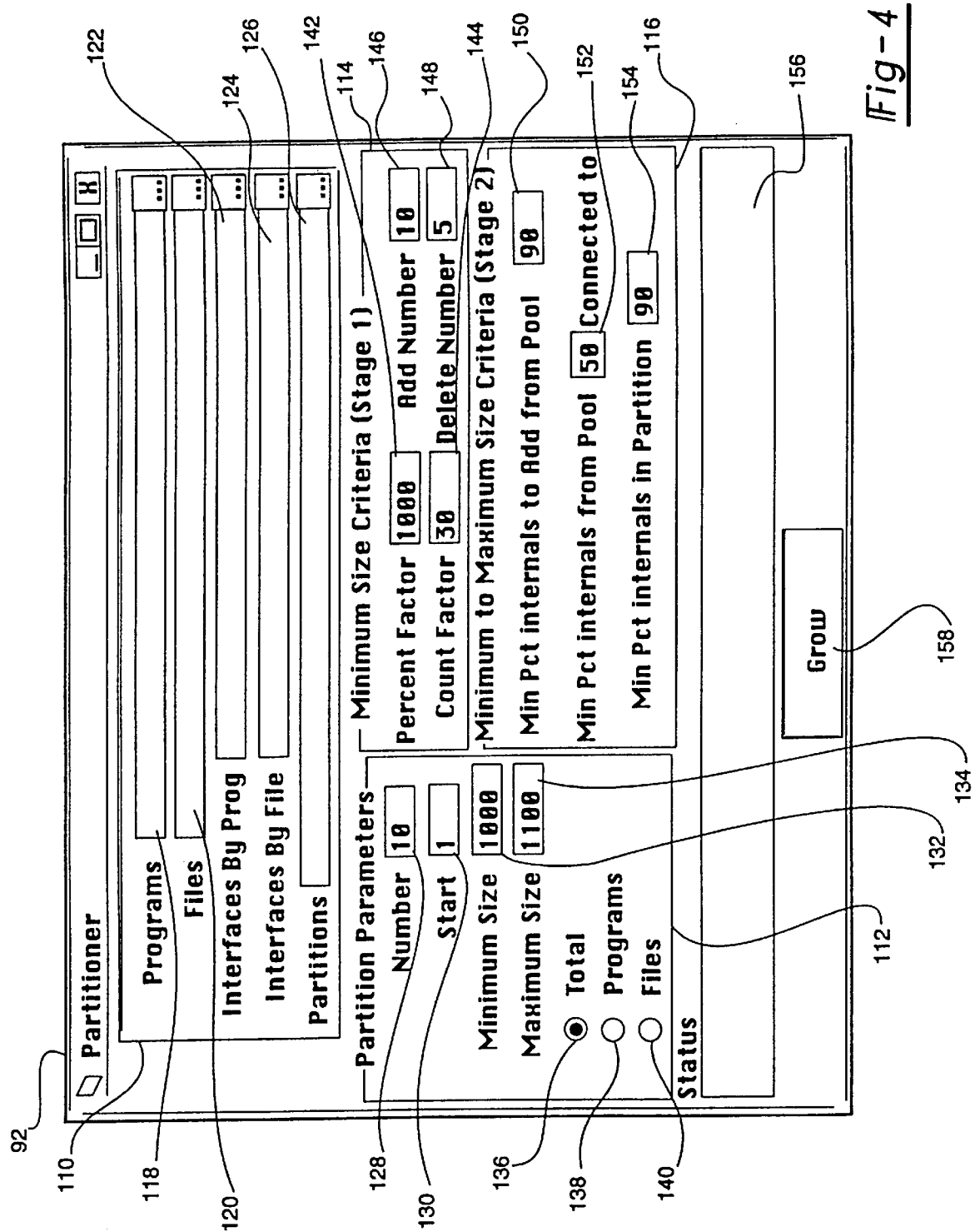
FIG. 4 is an illustration of the graphical user interface of the preferred embodiment of the present invention.

The last set of inputs used by the partitioner 98 are provided by the user through the GUI 92, which was implemented using Microsoft's Visual Basic. As Shown in FIG. 4, the GUI 92 has four input groups: input/output identification 110, partition parameters 112, minimum size criteria 114, and minimum to maximum size criteria 116.

The input/output identification 110 allows the user to enter the name of the four input files to be used by the partitioner. This includes Programs 118, which is the input file containing the Program names and partitions (if assigned), Files 120, which is the input file containing the Names and partitions (if assigned), Interfaces By Prog 122, which is the name of the file containing the Program/File connections ordered by Program name, and Interfaces By File 124, which is the name of the file containing the Program/File connections ordered by File name. Furthermore, the partitioner generated file which contains a list of the Programs and Files with the assigned partitions, may be designated by the user with Partitions 126.

The partition parameters group 112 provides the user with the ability to set Number 128, which is the number of partitions which are to generated, Start 130, which is the partition number from which to begin growing a partition, Minimum Size 132, which is the minimum number of objects to be contained in a single partition, and Maximum Size 134, which is the maximum number of objects to be contained in a single partition. The partition parameters group 112 also provides three buttons, Total 136, Programs 138, and Files 140, which allow the user to indicate if partition size is to be calculated based upon the number of both programs and files, the number of programs only, or the number of files only. The Minimum Size group 114 allows the user to specify parameters used in the first stage of partitioning, which is to be subsequently described. The Percent Factor 142 and Count Factor 144 provide a means of expressing a tradeoff between the number of connections and the percentage of its total connections an object has in partitions. A high Percent Factor 142 and low Count Factor 144 will result in objects with a low number of connection being favored, while a low Percent Factor 142 and high Count Factor 144 will result in objects with a high number of connections being favored.

The Add Number 146 and Delete Number 148 allow the user to dictate the number of objects to be added in each cycle used to grow a minimum size partition of the first stage, and the number of objects to be deleted during the same first stage cycle. The difference between the Add Number 146 and Delete Number 148 controls the incremental increase of the partition during each stage 1 cycle. The magnitude of the Add Number 146 and Delete Number 148 controls the amount of "look ahead" the partitioner performs in growing the partition. As an example, values of 10/5 versus 100/95 for Add Number 146/Delete Number 148 gives the same incremental increase of 5. The latter value performs a search which is increased by a magnitude, potentially providing a better solution. However, this potentially better solution comes with a higher computational cost.

The three user selected parameters of the Minimum to Maximum Size Criteria group 116, provides user control of the second stage of the partitioning, subsequently discussed. The Minimum Percentage to add from Pool 150 sets the threshold for the minimum percentage of connections an object must have after stage 1 has been completed in order to be included in the partition being generated. The higher the threshold, the lower the number of objects that will be added to the partition. A lower threshold is given for Minimum Percent Internal From Pool 152. Objects with a percentage of its connections in a partition will be added only if it is connected to an object already in the partition that has Minimum Percentage Internal in Partition 154 of its connections in the pool. This allows the user to "finish off" highly connected objects already in the partition by bringing in their remaining connections. The higher the thresholds, the lesser number of objects that will be added tao the partition.

Once the necessary information has been provided, the partitioner can begin to optimally cluster the pool of data center executables and files. The user initiates partition generation with the Grow button 158, and the Status Window 160 displays the current partition, partition size, and the stage of execution of the partition during execution.

Figure 5:
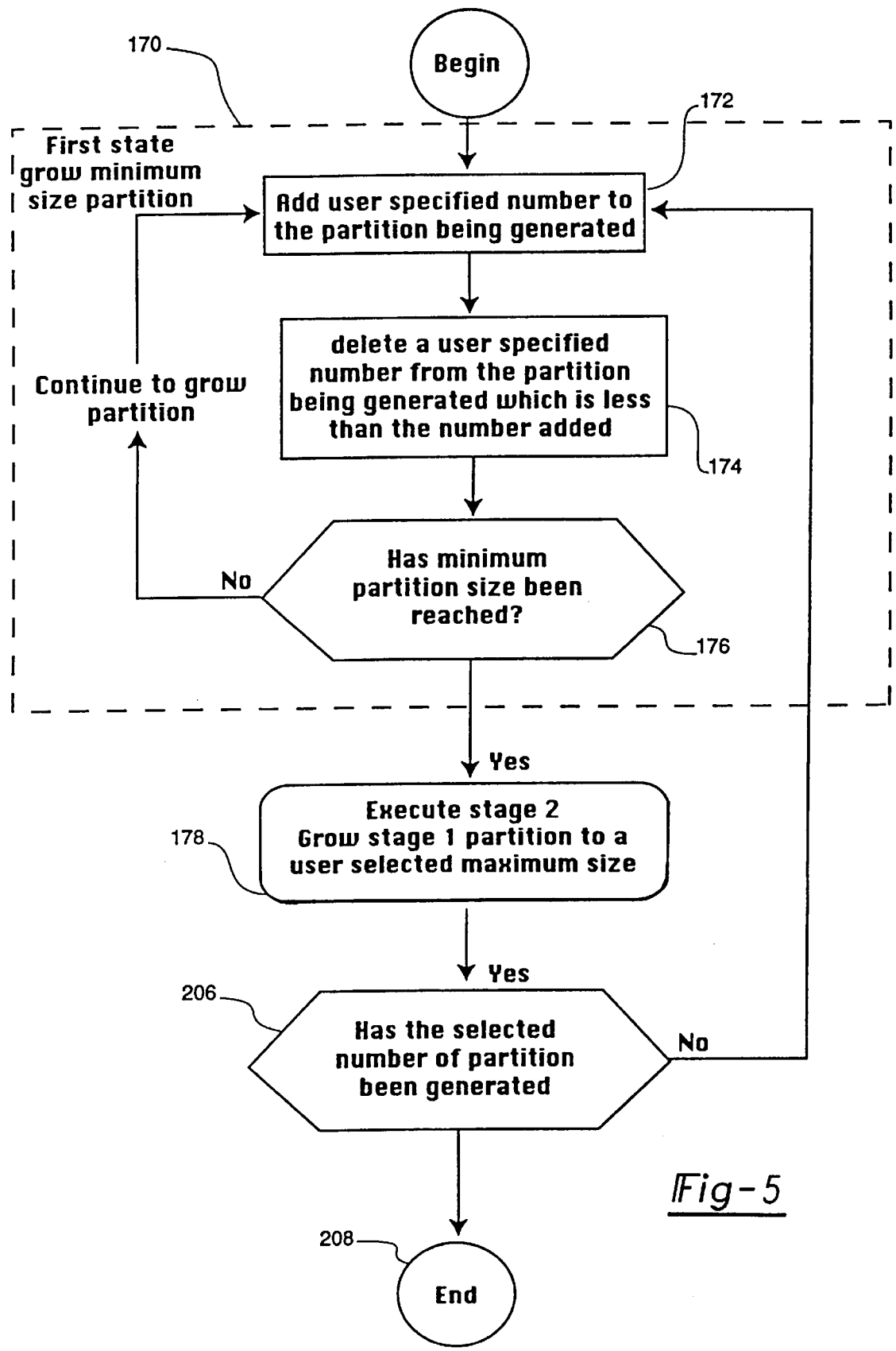
FIG. 5 is a flowchart depicting the functional flow of the two stage partitioning process performed by the partitioning system of the preferred embodiment of the present invention.

The partitioner utilizes a two stage approach which is presented in FIG. 5. The application which implemented these two steps was developed using Microsoft's Visual Basic. The first stage 170 entails growing a partition to a minimum size. This is done in an iterative manner by adding a user specified number of objects (Add Number 146 of FIG. 4) from the pool, to the partition currently being generated 172. After the specified number is added, a user specified number of objects (Delete Number 148 of FIG. 4), which is less than the number of objects added, is deleted from the partition and returned to the pool 174. The objects added or deleted during this stage are selected based upon a calculated "score" to be subsequently described.

Because the number to be added is greater than the number to be deleted, each iteration results in a net increase in the partition size. After each addition and deletion, the partition size is measured 176 (based upon user entered Minimum Size 132 of FIG. 4) and once the minimum size is reached, the second stage 178 is commenced.

Figure 6:
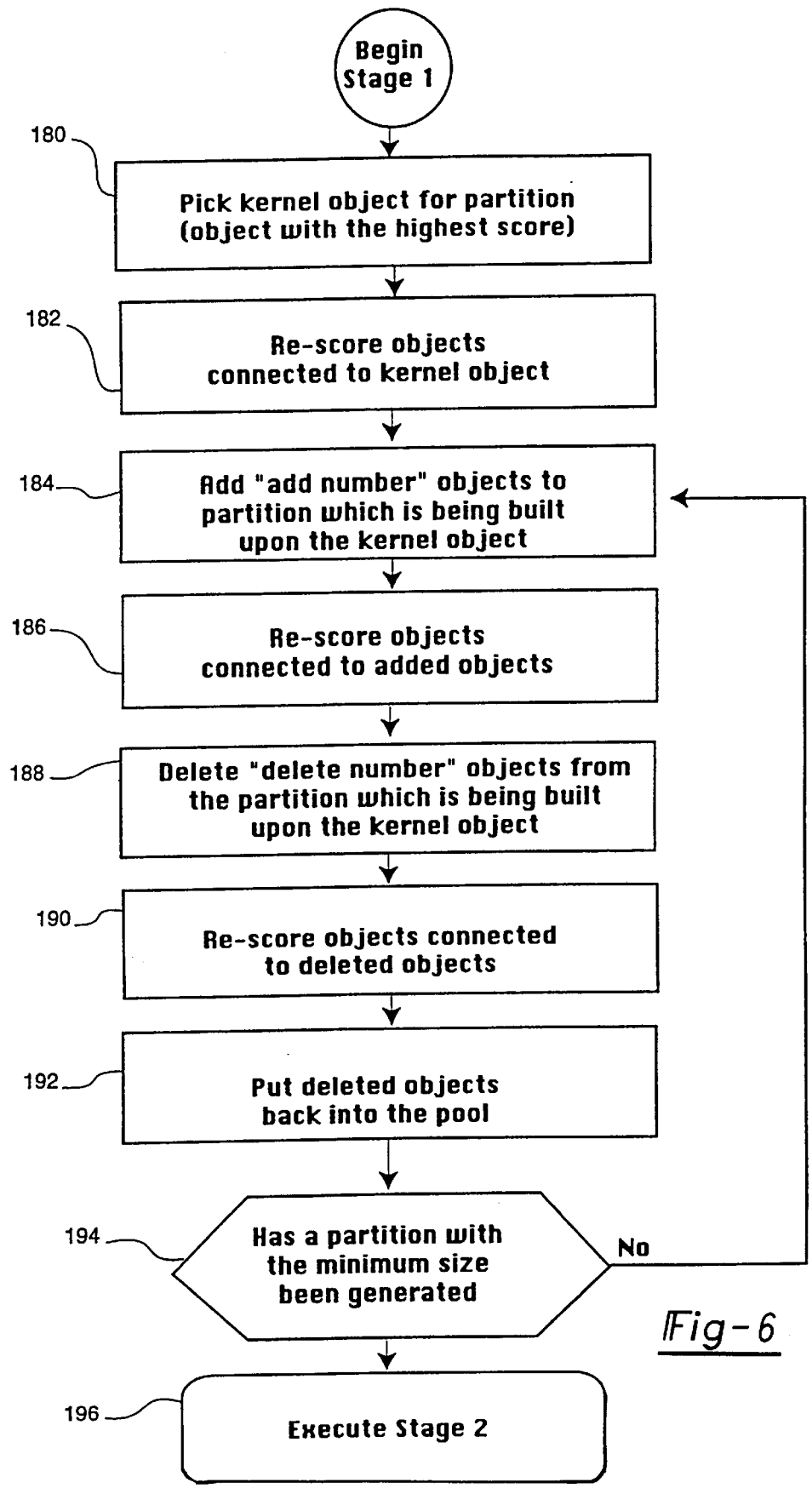
FIG. 6 is a flowchart depicting the functional flow of the first stage of the partitioning process which is performed by the partitioning system of the preferred embodiment of the present invention.

FIG. 6 provides additional details of the functional flow of the first stage of the partitioning process. Initially, a program or file is selected as the kernel object upon which to grow a partition 180. This initial selection is based upon a Score, which is calculated using equation (2). The Score has $$\text{Score} = C * (\text{\# of connections in a partition}) + P*((\text{\# of connections in a partition})/(\text{\# of connections})) \quad (2)$$

two components. The first component weighs the importance of the number of connections that the object has in a partition, and the second component normalizes the score with the fraction of the number of connections in a partition in relation to the objects total number of connections of the object.

In the event that there are multiple programs or files with the highest Score, the program or file with the greatest number of connections is selected as the kernel object. In addition, if no partitions have been created, all programs and files will have a score of zero, therefore the program or file with the greatest number of connections will be used as the kernel.

Once the kernel object has been chosen, the score for all objects, which are connected to the kernel object (i.e. having a reference to or from the kernel object) are re-Scored 182 using equation (2). The user specified number of objects with the highest score are then added to the current partition being generated 184, and the Score for each object connected to an added object is recalculated using equation (2) 186. After this is accomplished, a user specified number of objects are deleted from the partition 188. The objects deleted are those with the lowest score. The objects connected to the deleted objects are then re-scored using equation (2) 190, and the deleted objects are then returned to the general pool 192.

After this has been accomplished, the partition size is measured to determine if the minimum size for a partition has been reached 194. If the minimum size has not been reached, the first stage process is repeated, starting with the addition of the specified number of objects with the highest score 184. If the minimum partition size has been reached, stage two is initiated 196.

Figure 7:
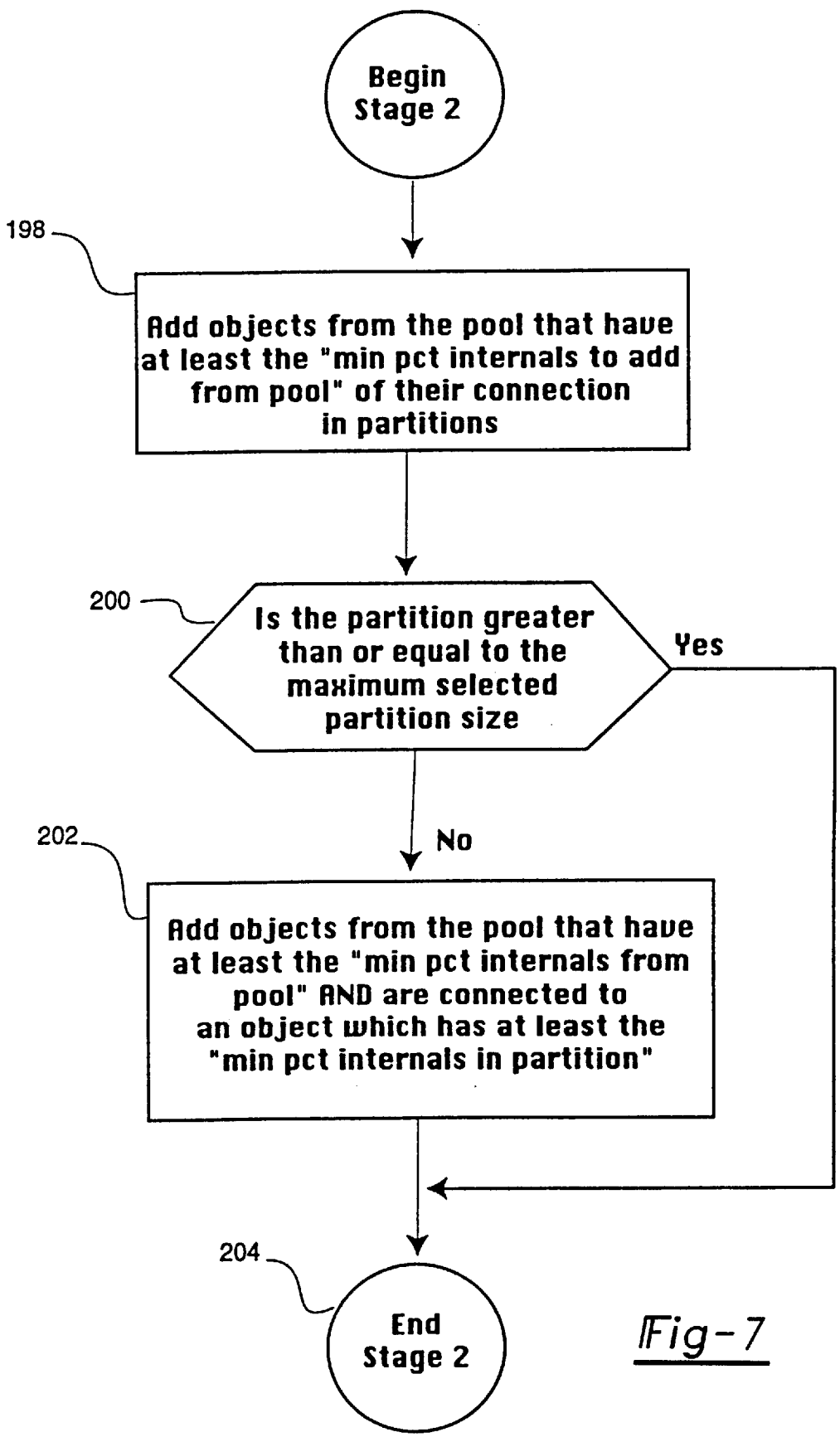
FIG. 7 is a flowchart depicting the functional flow of the second stage of the partitioning process which is performed by the partitioning system of the preferred embodiment of the present invention.

Referring to FIG. 7, the second stage of the partitioning entails growing the partition of the first stage until a maximum partition size is reached. This is done by attempting to add all objects having a percentage of their connections in a stage 1 partition or a certain fraction threshold of their connections to the stage 1 generated partition 198, as it is referred. (set by the user selection of Min Pct Internals to Add from Pool 150 of FIG. 4). If this results in a partition which is greater than or equal to the maximum desired size of a partition 200 (set by Maximum Size 134 of FIG. 4), the second stage is complete 204. If the maximum size of the partition is not reached, and all objects with a certain fraction threshold of their connections are included in the first stage partition, objects that have at least a certain lower minimum percentage threshold of their connections in partitions are added to the partition under development if connected to an object that has at least a certain higher minimum percentage of their connections in a partition already created 202. (Note that the certain lower minimum percentage is specified by the user in Min Pct Internals from Pool 152, and the certain higher minimum percentage is specified by Connected to Min Pct Internals in Partition 154, both of FIG. 4). Once this has been accomplished, the second stage is complete 204.

Referring to FIG. 5, after the second stage is complete, the determination is made as to whether the user selected number of partitions has been generated with the addition of the partition created during the current iteration 206. If the correct number of partitions has been generated, the partitioning is complete, and the application ends 208. If more partitions are required, stage 1 is re-initiated, beginning with the addition of a user specified number of objects to the new partition being generated 172.

Figure 8:
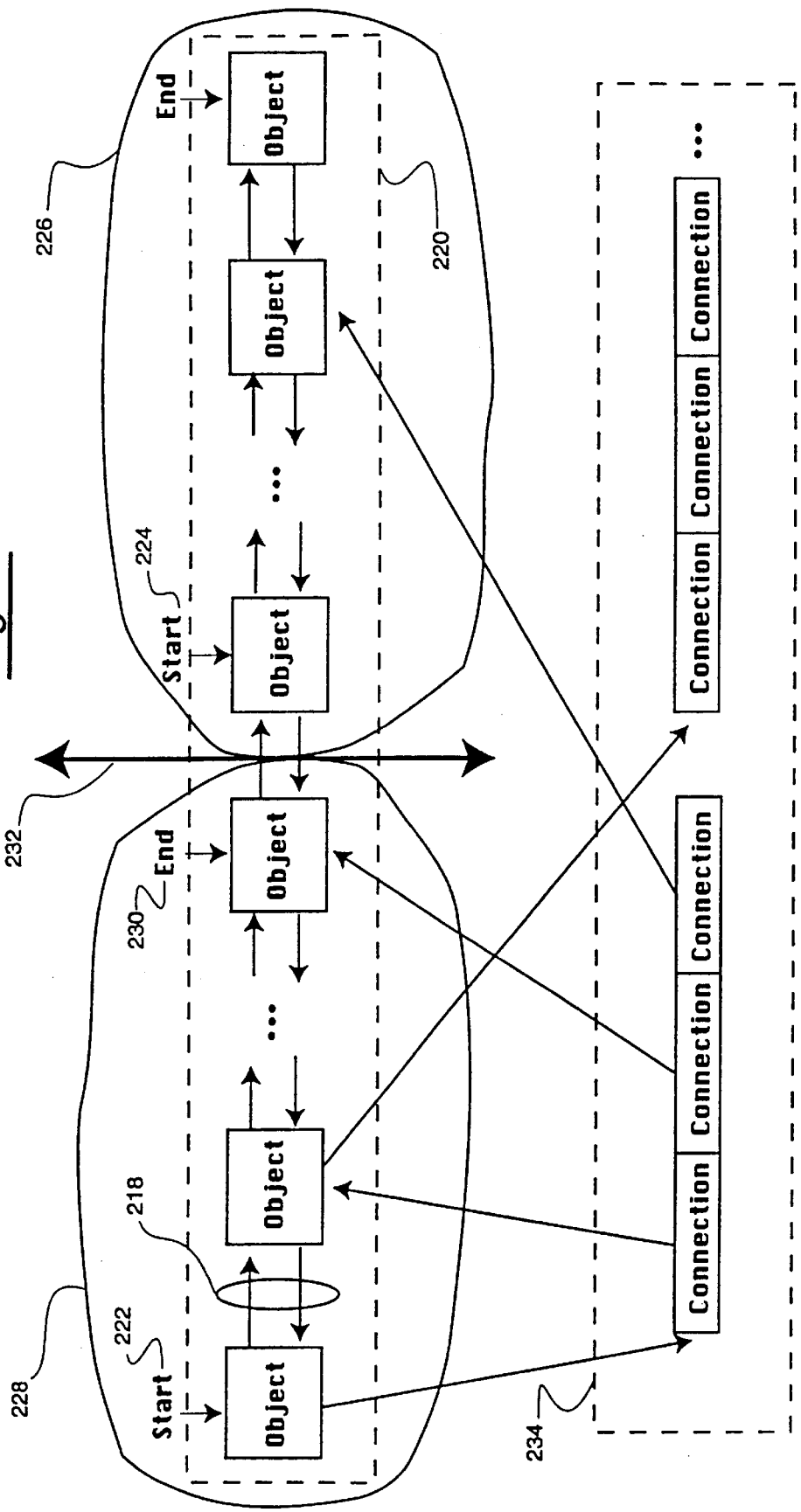
FIG. 8 is an illustration of the logical design for implementation of the Partitioner application of the preferred embodiment of the present invention.

FIG. 8 presents the logical design for implementing the partitioner application. The design is centered around a double linked 218 list of objects that are to be partitioned 220. The list objects 220 is ordered based upon the score of the objects, as calculated using equation (2). The higher the score, the closer an object is to the start position (222, 224) of the partition 228 and pool 226. Furthermore, by maintaining the start position (224) of the pool 226 and end position of the partition 228, the boundary 232 between the partition 228 and pool 226 is created.

An array of connections 234 is defined for each object. Each object has an array of pointers to all other objects that are referenced by the object. In this way, as an object is added or deleted from the partition, the array of connections 234 can be used to directly update the scores of the connected objects. Furthermore, an object with an updated score can be easily moved up or down the collection through the use of the double linked list, with most objects moved in small incremental steps, thereby minimizing the cost of a linear search in order to reorder the object in the double linked list.

The following partition object data type was defined in Visual Basic 3.0.

```
Type Partition Object
    Next As Long
    Previous As Long
    Total As Integer
    Internal As Integer
    ScoreFactor As Integer
    Score As Long
    Partition As Integer
    Connection As Long
End Type
```

This allows an array of partitions to be created, with indexes in the Partition Object array used as pointers. The "Next" and "Previous" fields are pointers that provide the double linked list capability. "Total" is the total number of connections of an object, with the number of connections that an object has contained in a partition, specified by "Internal." The "ScoreFactor" based on the user provided parameters is maintained, along with the current "Score" of the object. The current partition to which an object is assigned is stored, and "Connection" provides an index into the Connection array that points to the set of references of an object.

A limitation of Visual Basic 3.0 is that a single dimension in an array limited to 32K. This limitation places the requirement to have a multi-dimensional array when a data object, having a 32K size, may exist. The partition objects array of the preferred embodiment supports nearly 100,000 Partition objects. In addition, a subroutine can be defined ('pntrListConvert') that converts the 'long' index into two 'integer' indexes for the two dimension array using integer division and modulus functions. The declaration used are as follows:

```
ReDim PartitionObjectsArray(0 to 2, 0 to 32766) as PartitionObject
    Global ConnectionsArray(0 to 9, 0 to 30000) as Long
    Sub pntrListConvert (anID As Long, anID1 As Integer, AnID2 as Integer)
```

For illustrative purposes, appendix 1 presents an example of how an object (referred in the source code as an element) is moved through an array using the "Next" and "Previous" pointers. Movement forward in the List is based on the score of the object. The higher the score, the closer to the front of the list an object will be located. The "Previous" pointers of the objects in the list are used to find the correct position for the given object. Once found, the affected object pointers are updated. Conversion to the two dimension array is also shown in the illustrative example of appendix 1.

From the foregoing, it will be seen that the present invention provides an apparatus and method for optimally clustering a pool of data center executables and files into manageable conversion sizes. The system is capable of being integrated with a wide variety of information systems. Therefore, while the invention is illustrated and described in conjunction with a certain application format, it will be understood that the principles of the invention can be adapted to virtually any software partitioning. Accordingly, it should be understood that the present invention is capable of certain modification and change without departing from the spirit of the invention as set forth in the appended claims.

APPENDIX 1

```
Function prtnrListMoveForward (anElementID As Long, listSize; As
Long, listStart As Long, listEnd As Long)
    Dim t1 As Integer, t2 As Integer, anIndexID1 As Integer,
anIndexID2 As Integer,
            anElementID1 As Integer, anElementID2 As Integer
    Dim anIndexID AsLong
    'ONLY MOVE IF ITS NOT ALREADY AT BEGINNING OF LIST
    If anElementID <> listStart Then
        'FIND FIRST ELEMENT THAT HAS A GREATER SCORE
        prtnrListConvert anElementID, anElementID1, anElementID2
        anIndex ID - Elements (anElementID1, anElementID2).Previous
        prtnrListConvert anIndexID, anIndexID1, anIndexID2
        Do While (Elements(anElementID1, anElementID2).Score >
Elements(anIndexID1, an IndexID2).Score)
            'CHECK FOR BEGINNING OF LIST
            If (anIndexID listStart) Then
                'DELETE THEN ADD ELEMENT TO BEGINNING
OF LIST
                x - prtnrListDelete(anElementID, listSize,
listStart, listEnd)
                x - prtnrListAddFromStart(anElementID, listSize,
listStart, listEnd)
                Exit Function
            End If
            anIndexID = Elements(anIndexID1, anIndexID2).Previous
            prtnrListConvert anIndexID, anIndexID1, anIndexID2
        Loop
        'CHANGE POINTERS ONLY IF IT HAS MOVED
        If anIndexID <> Elements(anElementID1, anElementID2).Previous
Then
            x - prtnrListDelete(anElementID, listSize, listStart, listEnd)
            Elements(anElementID1, anElementID2).Next -
Elements(anIndexID1, anIndexID2).Next
            prtnrListConvert Elements(anIndexID1, anIndexID2).Next, t1, t2
            Elements(t1, t2).Previous = anElementID
            Elements(anIndexID1, anIndexID2).Next = anElementID
            Elements(anElementID1, anElementID2).Previous = anIndexID
            listSize = listSize + 1
        End If
    End If
End Function
```

We claim:

1. A apparatus for clustering a pool of software objects into multiple partitions having minimized connections between each of the multiple partitions so that software redevelopment of a software system containing said pool of software objects is divided into manageable conversion sizes which can be performed over an extended period of time, with minimal interruption to operation of said software system, and minimizing the work necessary to complete software redevelopment of said software system, comprising:

an interface for receiving initial parameters;
a memory having a first data structure and a second data structure, said first data structure having said initial parameters received from said interface, said second data structure having relational data of said software objects; and
a partitioner receiving said first and second data structure, said partitioner dividing said pool of software objects into said multiple partitions based upon said initial parameters and said relational data, whereby said pool of software objects is divided into manageable conversion sizes which can be performed over an extended period of time, with minimal interruption to operation of said software system utilizing said software objects, and reducing work necessary to complete software redevelopment of said software system.

2. The apparatus of claim 1 wherein said partitioner has a first processing module for growing a first partition based on a score, said score representing the importance of the connections a single object has in said first partition and the number of connections said single object has in said first partition in relation to the total number of connections of said single object, said processing module adding a first number of objects to said partition having said score with the greatest value, recalculating said score for objects connected to said first number of objects, deleting a second number of objects from said first partition having said score with the least value, and continuing said additions and deletions from said first partition until said first partition is grown to have at least a minimum number of objects specified by one of said initial parameters.

3. The apparatus of claim 2 wherein said partitioner has a second processing module for growing said first partition grown by said first processing module until said first partition contains a maximum number of objects specified by one of said initial parameters, said second processing module growing said first partition grown by said first processing module by adding a first set of non-contained objects, which are those objects not contained in said first partition after execution of said first processing module, said additions of said second processing module based upon the percentage of connections each of said first set of non-contained objects has to said first partition.

4. The apparatus of claim 3 wherein said second processing module continues growing said first partition grown by said first processing module if said addition of said first set of non-contained objects does not produce a first partition size with said maximum number of objects, said second processing module continuing to grow said first partition grown by said first processing module by adding a second set of non-contained objects, which are those objects not contained in said first partition after said addition of said second processing module based upon the percentage of connections each of said non-contained objects has to said first partition, said second addition of said second set of non-contained objects based upon a percentage of connections each of said second set of non-contained objects has to said first partition and a percentage of connections each of said second set of non-contained objects has to partitions previously generated.

5. The apparatus of claim 2 wherein said score is expressed as:

$$\text{Score} = C * (\# \text{ of connections in a distinct group}) + P * \frac{(\# \text{ of connections in a distinct group})}{(\# \text{ of total connections})}.$$

6. The apparatus of claim 2 wherein said first processing module uses a double linked list of said software objects to be clustered into multiple partitions.

7. The apparatus of claim 2 wherein said second processing module uses a double linked list of said software objects to be clustered into multiple partitions.

8. The apparatus of claim 2 wherein said first processing module uses an array of connections, said array of connections having pointers from each of said data objects to other data objects having connections.

9. The apparatus of claim 2 wherein said second processing module uses an array of connections, said array of connections having pointers from each of said data objects to other data objects having connections.

10. The apparatus of claim 1 wherein said software redevelopment of a software system is performed in order to correct software problems caused by the year 2000.

11. The apparatus of claim 1 wherein said software system is used by an automotive manufacturer.

12. The apparatus of claim 1 wherein said interface is a graphical user interface.

13. A method for clustering a pool of software objects into a partition with minimized connections to other partitions so that software redevelopment of a software system containing said pool of software objects may be divided into manageable conversion sizes in order to facilitate software redevelopment of the software system, comprising the steps of:

(a) selecting at least one of said software objects as a kernel object from which to grow said partition, said partition to be grown from said pool of software objects;

(b) calculating a score for each of said software objects having a connection with said kernel object, said score representing the importance of the connection a single object has in said partition and the number of connections said single object has in said partition in relation to the total number of connections of said single object;

(c) adding a first number of objects to said partition based upon said score;

(d) recalculating said score for each object connected to said first number of objects added to said partition;

(e) deleting a second number of objects from said partition based upon said score;

(f) recalculating said score for each object deleted from said first partition; and (g) repeating steps (c) through (f) until said first partition has a minimum number of objects, whereby said partition is grown which has minimized connections to other partitions so that software redevelopment of the software system containing the pool of software objects may be divided into manageable conversion sizes in order to facilitate software redevelopment of the software system.

14. The method of claim 13, further comprising the step of adding a first set of non-contained objects, which are those objects not contained in said first partition having said minimum number of objects, said addition of said first set of non-contained objects based upon the percentage of connections each of said first set of non-contained objects has to said first partition having said minimum number of objects.

15. The method of claim 14, further comprising the step of adding a second set of non-contained objects, which are those objects not contained in said first partition after said addition of said first set of non-contained objects, said addition of said second set of non-contained based upon a percentage of connections each of said second set of non-contained objects has to said first partition and a percentage of connections each of said second set of non-contained objects has to partitions previously generated.

16. The method of claim 13 wherein said score is expressed as:

$$\text{Score} = C * (\text{\# of connections in a distinct group}) + P * \frac{(\text{\# of connections in a distinct group})}{(\text{\# of total connections})}.$$

17. The method of claim 13 wherein said clustering of said pool of software objects is centered around a double-linked list of said software objects.

18. The method of claim 13 further comprising the step of ordering said software objects based upon said score of each of said software objects.

19. The method of claim 13 wherein said software redevelopment of a software system is performed in order to correct software problems caused by the year 2000.

20. An apparatus for organizing a plurality of software objects into groups based on object relationships, comprising:

a memory having data structure for storing object identifiers to represent said software objects, link identifiers to represent said object relationships and partition identifiers to represent inclusion in a cluster;

a partitioner for generating at least one cluster of said software objects and for representing said cluster using said object identifiers and said partition identifiers;

said partitioner having system for defining a score reflecting an object's relationship to the cluster and to said software objects;

said partitioner selectively adding a first plurality of software objects to said cluster by using said link identifiers to calculate the score of objects having relationships with objects included in said cluster and then using the object identifiers and partition identifiers to indicate the inclusion of said first plurality in said cluster;

said partitioner selectively removing at least one second software object from said cluster by calculating the score of objects included in said cluster and then using the object identifiers and partition identifiers to indicate the exclusion from said second of software objects from said cluster; and said partitioner generating output using said object identifiers and partition identifiers to specify selected software objects as members of a group, whereby said plurality of software objects are organized.

* * * * *